United States Patent
Gong et al.

(10) Patent No.: US 11,301,355 B2
(45) Date of Patent: Apr. 12, 2022

(54) METHOD, ELECTRONIC DEVICE, AND COMPUTER PROGRAM PRODUCT FOR ANALYZING LOG FILE

(71) Applicant: EMC IP Holding Company LLC, Hopkinton, MA (US)

(72) Inventors: Min Gong, Shanghai (CN); Xiaogang Wang, Shanghai (CN); Chun Xi Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/002,333

(22) Filed: Aug. 25, 2020

(65) Prior Publication Data
US 2022/0027253 A1     Jan. 27, 2022

(30) Foreign Application Priority Data
Jul. 27, 2020 (CN) .............................. 202010730016

(51) Int. Cl.
*G06F 11/00* (2006.01)
*G06F 11/34* (2006.01)
(Continued)

(52) U.S. Cl.
CPC ........ *G06F 11/3476* (2013.01); *G06F 11/079* (2013.01); *G06F 11/0787* (2013.01); *G06K 9/6215* (2013.01)

(58) Field of Classification Search
CPC ............. G06F 11/3476; G06F 11/0787; G06F 11/079; G06K 9/6215
See application file for complete search history.

(56) References Cited

U.S. PATENT DOCUMENTS 5,463,768 A * 10/1995 Cuddihy ............. G06F 11/2205
                                                    714/37
6,173,418 B1 * 1/2001 Fujino ................. G06F 11/3476
                                                    714/20
(Continued)

OTHER PUBLICATIONS

Appendix 1 to the Oct. 2019 Update: Subject Matter Eligibility, p. 1-41 (Year: 2019).*

(Continued)

*Primary Examiner* — Jonathan D Gibson
(74) *Attorney, Agent, or Firm* — Ryan, Mason & Lewis, LLP (57) ABSTRACT

Embodiments of the present disclosure relate to a method, an electronic device, and a computer program product for analyzing a log file. The method may include: determining, based on a plurality of reference patterns, corresponding patterns for a plurality of log records in the log file. The method may further include: respectively determining the plurality of log records as a plurality of log identifiers corresponding to the corresponding patterns. The method further includes: determining, from the plurality of log identifiers, a log identifier to be analyzed corresponding to a predetermined event. In addition, the method may further include: selecting a target reference log identifier from a plurality of reference log identifiers corresponding to the plurality of reference patterns, wherein a first similarity between the target reference log identifier and the log identifier to be analyzed is higher than a first threshold similarity.

20 Claims, 5 Drawing Sheets

(51) Int. Cl.
*G06F 11/07* (2006.01)
*G06K 9/62* (2022.01)

(56) References Cited

U.S. PATENT DOCUMENTS

| | | | | |
|---|---|---|---|---|
| 9,411,672 | B1* | 8/2016 | Cooper | H04L 41/16 |
| 10,698,756 | B1* | 6/2020 | Abdelsalam | G06F 16/901 |
| 10,922,163 | B2* | 2/2021 | Spencer | G06F 11/0787 |
| 2004/0059966 | A1* | 3/2004 | Chan | G06F 11/0775 |
| | | | | 714/48 |
| 2006/0184529 | A1* | 8/2006 | Berg | G06F 11/0784 |
| 2006/0195297 | A1* | 8/2006 | Kubota | G06F 16/95 |
| | | | | 702/187 |
| 2009/0113246 | A1* | 4/2009 | Sabato | G06F 11/0706 |
| | | | | 714/37 |
| 2015/0089309 | A1* | 3/2015 | Fu | G06F 11/0724 |
| | | | | 714/57 |
| 2016/0098304 | A1* | 4/2016 | Rosier | G06F 11/321 |
| | | | | 719/318 |
| 2016/0253229 | A1* | 9/2016 | Sade | H04L 41/06 |
| | | | | 714/37 |
| 2018/0046529 | A1* | 2/2018 | Togawa | G06F 11/0751 |
| 2018/0113773 | A1* | 4/2018 | Krishnan | G06F 11/008 |
| 2018/0307551 | A1* | 10/2018 | Bacha | G06F 11/0709 |
| 2019/0095313 | A1* | 3/2019 | Xu | G06F 11/006 |
| 2019/0258535 | A1* | 8/2019 | Morisse | G06F 11/079 |
| 2019/0258725 | A1* | 8/2019 | Parthasarathy | G06F 11/3452 |
| 2019/0286628 | A1* | 9/2019 | Zhou | G06F 11/0751 |
| 2019/0317875 | A1* | 10/2019 | Liu | G06F 11/0787 |
| 2019/0354457 | A1* | 11/2019 | Urmanov | H04L 63/1425 |
| 2019/0370347 | A1* | 12/2019 | Levy | G06F 16/355 |
| 2020/0371897 | A1* | 11/2020 | Hansmann | G06F 11/3476 |
| 2021/0326197 | A1* | 10/2021 | Honnappa | G06F 11/3636 |

OTHER PUBLICATIONS

Wikipedia, "Hamming Distance," https://en.wikipedia.org/wiki/Hamming_distance, Apr. 3, 2020, 6 pages.
Wikipedia, "Bag-of-Words Model," https://en.wikipedia.org/wiki/Bag-of-words_model, Mar. 31, 2020, 5 pages.
Wikipedia, "Levenshtein Distance," https://en.wikipedia.org/wiki/Levenshtein_distance, Apr. 7, 2020, 8 pages.
Wikipedia, "tf-idf," https://en.wikipedia.org/wiki/Tf-idf, Mar. 29, 2020, 7 pages.
Wikipedia, "Stack Trace," https://en.wikipedia.org/wiki/Stack_trace, Mar. 10, 2020, 2 pages.
Tensor Flow Core, "Embedding Projector," https://projector.tensorflow.org/, 2020, 1 pages.

* cited by examiner

| Log Identifier | Pattern | Log Record |
|---|---|---|
| 97ac8dd4dfa014642e89 | Event timer <*> frequency <*>Hz quality <*> | Event timer "HPET" frequency 14318180 Hz quality 350 |
| | | Event timer "HPET1" frequency 14318180 Hz quality 340 |
| | | Event timer "HPET3" frequency 14318180 Hz quality 340 |
| | | Event timer "HPET4" frequency 14318180 Hz quality 340 |
| | | Event timer "HPET5" frequency 14318180 Hz quality 340 |
| | | Event timer "HPET6" frequency 14318180 Hz quality 340 |
| | | Event timer "HPET7" frequency 14318180 Hz quality 340 |
| | | Event timer "RTC" frequency 32768 Hz quality 0 |
| 93f01f6653a0b7a25f61 | replay Idnum <*> su<*>d after writing 0/0 bufs | replay Idnum 4 succeeded after writing 0/0 bufs |
| | | replay Idnum 8 succeeded after writing 0/0 bufs |
| | | replay Idnum 14 succeeded after writing 0/0 bufs |
| 016be23edf5c2d902287 | Local <*> is already running | Local isi_stats_hist_d is already running |
| | | Local isi_stats_d is already running |
| | | Local isi_km_d is already running |
| | | Local isi_hangdump is already running |
| | | Local isi_job_d is already running |
| | | Local snmp is already running |
| | | Local isi_smartconnect is already running |
| | | Local isi_flexnet_d is already running |
| | | Local isi_cpool_io_d is already running |
| | | Local isi_cpool_d is already running |
| | | Local lwsm is already running |

METHOD, ELECTRONIC DEVICE, AND COMPUTER PROGRAM PRODUCT FOR ANALYZING LOG FILE

RELATED APPLICATION(S)

The present application claims priority to Chinese Patent Application No. 202010730016.3, filed Jul. 27, 2020, and entitled "Method, Electronic Device, and Computer Program Product for Analyzing Log File," which is incorporated by reference herein in its entirety.

FIELD

The present disclosure generally relates to the field of computers, and more particularly, to a method, an electronic device, and a computer program product for analyzing a log file.

BACKGROUND

At present, a log recording mechanism in a large IT system is used to record events that occur when the system or other software is operated, and to generate a log file composed of several log records. Then, a process of analyzing the log records in the log file is a process of analyzing the log file. The analysis process for the log file is important in processes of system monitoring and troubleshooting. For example, in the process of system monitoring, when critical logs (such as thread crashes and critical service failures) appear, alerts and notifications can be sent. Generally, the detection of critical logs is a rule-based matching process, that is, a monitoring system scans the log records and issues a notification when a log record that meets a specific rule appears. However, the rule-based matching process cannot exhaust all possibilities and still requires excessive labor costs.

SUMMARY

Embodiments of the present disclosure provide a method, an electronic device, and a corresponding computer program product for analyzing a log file.

In a first aspect of the present disclosure, a method for analyzing a log file is provided. The method may include: determining, based on a plurality of reference patterns, corresponding patterns for a plurality of log records in the log file. The method may further include: respectively determining the plurality of log records as a plurality of log identifiers corresponding to the corresponding patterns. The method further includes: determining, from the plurality of log identifiers, a log identifier to be analyzed corresponding to a predetermined event. In addition, the method may further include: selecting a target reference log identifier from a plurality of reference log identifiers corresponding to the plurality of reference patterns, wherein a first similarity between the target reference log identifier and the log identifier to be analyzed is higher than a first threshold similarity.

In some embodiments, the method may further include: processing, based on a predetermined diagnosis strategy of the target reference log identifier for the predetermined event, a log record corresponding to the log identifier to be analyzed.

In some embodiments, selecting the target reference log identifier may include: acquiring a context log identifier associated with the log identifier to be analyzed and a reference context log identifier associated with the target reference log identifier; determining a second similarity between the context log identifier and the reference context log identifier; determining a comprehensive similarity based on the first similarity and the second similarity; and according to a determination that the comprehensive similarity is higher than a second threshold similarity, processing, based on the predetermined diagnosis strategy of the target reference log identifier for the predetermined event, a log record corresponding to the log identifier to be analyzed.

In some embodiments, a time interval between the context log identifier and the log identifier to be analyzed is less than a threshold time interval, and a time interval between the reference context log identifier and the target reference log identifier is less than the threshold time interval.

In some embodiments, determining the corresponding patterns of the plurality of log records may include: acquiring the plurality of reference patterns from a reference pattern database; and in response to matching of a first log record in the plurality of log records with a first reference pattern in the plurality of reference patterns, determining the first reference pattern as a pattern of the first log record.

In some embodiments, respectively determining the plurality of log records as the plurality of log identifiers includes: acquiring, from the reference pattern database, a mapping relationship between the plurality of reference patterns and the plurality of reference log identifiers; acquiring, based on the mapping relationship, a reference log identifier corresponding to the first reference pattern; and determining the reference log identifier corresponding to the first reference pattern as a log identifier of the first log record.

In some embodiments, determining the log identifier to be analyzed corresponding to the predetermined event includes: determining, based on time stamp information of the log file, the log identifier to be analyzed when the predetermined event occurs.

In some embodiments, the predetermined event includes at least one of the following: a thread crash event; a user report event; and a system indicator abnormity event.

In a second aspect of the present disclosure, an electronic device is provided. The device may include: at least one processing unit; and at least one memory coupled to the at least one processing unit and storing machine-executable instructions, wherein the instructions, when executed by the at least one processing unit, cause the device to perform actions, and the actions may include: determining, based on a plurality of reference patterns, corresponding patterns for a plurality of log records in a log file. The method may further include: respectively determining the plurality of log records as a plurality of log identifiers corresponding to the corresponding patterns. The method further includes: determining, from the plurality of log identifiers, a log identifier to be analyzed corresponding to a predetermined event. In addition, the method may further include: selecting a target reference log identifier from a plurality of reference log identifiers corresponding to the plurality of reference patterns, wherein a first similarity between the target reference log identifier and the log identifier to be analyzed is higher than a first threshold similarity.

In a third aspect of the present disclosure, a computer program product is provided. The computer program product is tangibly stored on a non-transitory computer readable medium and includes machine-executable instructions; and the machine-executable instructions, when executed, cause a machine to perform steps of the method described according to the first aspect.

This Summary is provided to introduce the selection of concepts in a simplified form, which will be further described in the detailed description below. The Summary is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," etc. may refer to different or the same objects. Other explicit and implicit definitions may also be included below.

In order to monitor a system, a rule-based log file analysis mechanism is usually established. Although conventional rule-based log file analysis mechanisms can fully monitor log records that meet rules set by an administrator in advance, the rule-based log file analysis mechanism cannot exhaust all the log records. For different types of log records for which no rule is set by the administrator in advance, the analysis mechanism is not flexible enough. Therefore, newly emerged log records that do not meet the predetermined rules may be missed in the system monitoring. In addition, in order to set more complete rules, the administrator will also study the newly emerged log records and update the rules, which also increases the costs of rule construction and maintenance.

In addition, although the natural language processing (NLP) technology has been applied to identify semantics of log records to perform analysis on a log file, the analysis result of the log file based on the NLP technology may not be available since most log records are generated line by line by a specific code base, that is, the expression of the log records is different from that of human language.

In order to at least partially solve the above and other potential problems and shortcomings, an embodiment of the present disclosure presents a solution for analyzing various log records in a log file. In this solution, patterns (also referred to as "modes") corresponding to the log records are determined, and then the log records are converted into corresponding log identifiers based on a preset mapping relationship between patterns and log identifiers. After that, at least one set of log records is extracted from the log file by selecting a log identifier to be analyzed corresponding to a predetermined event and surrounding context log identifiers of the log identifier to be analyzed, and the log identifier to be analyzed and the context log identifiers are compared with a target reference log identifier and reference context log identifiers stored in a database, so that a representation set with the highest or relatively high similarity with the set is selected to provide a reference for subsequent operations on the predetermined event. Therefore, this solution can accurately and efficiently monitor log records, so that system requirements can be discovered in time and labor costs can be reduced. The basic idea of the present disclosure will be discussed in conjunction with FIG. 1 below.

Figure 1:
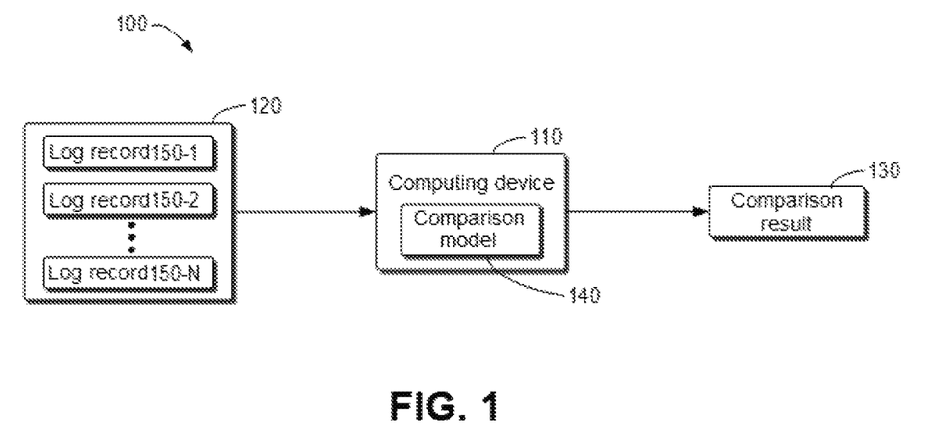
FIG. 1 shows a schematic diagram of an example environment in which a plurality of embodiments of the present disclosure can be implemented.

FIG. 1 shows a schematic diagram of example environment 100 in which a plurality of embodiments of the present disclosure can be implemented. As shown in FIG. 1, example environment 100 includes computing device 110, log file 120, and comparison result 130. In addition, computing device 110 also includes comparison model 140. Log file 120 may include a set of log records for displaying the operation process of an IT system, for example, log record 150-1, log record 150-2, . . . , log record 150-N (hereinafter collectively referred to as log record 150). Computing device 110 may receive log file 120 and convert log records 150 therein into log identifiers, and determine comparison result 130 through comparison model 140 in computing device 110. Comparison result 130 may determine a target reference log identifier in the database that has the highest or relatively high similarity with one or more of the plurality of log identifiers converted from log records 150. A processing strategy of a corresponding log record may be determined based on a diagnosis strategy of the target reference log identifier for a predetermined event.

In FIG. 1, the key to generate comparison result 130 based on log file 120 lies in two points. First, comparison model 140 may determine the log identifier to be analyzed corresponding to the predetermined event and the context log identifiers, and respectively compare the log identifier to be analyzed and context log identifiers with the target reference log identifier and reference context log identifiers in the database, thereby determining comprehensive comparison result 130. Second, comparison model 140 in computing device 110 is a model based on a known algorithm. For example, the corresponding patterns of the log records may be determined based on the Hamming distance algorithm, the Hashing algorithm, or the like. A similarity comparison result between a sequence of the log identifier to be analyzed and a sequence of the corresponding reference log identifier in the database may be determined based on the Levenshtein distance algorithm or the like. Preferably, comparison model 140 may also be a machine learning or deep learning model constructed by training in advance, such as BERT (Bidirectional Encoder Representations from Transformers). The construction and use of comparison model 140 will be described below with reference to FIG. 2.

Figure 2:
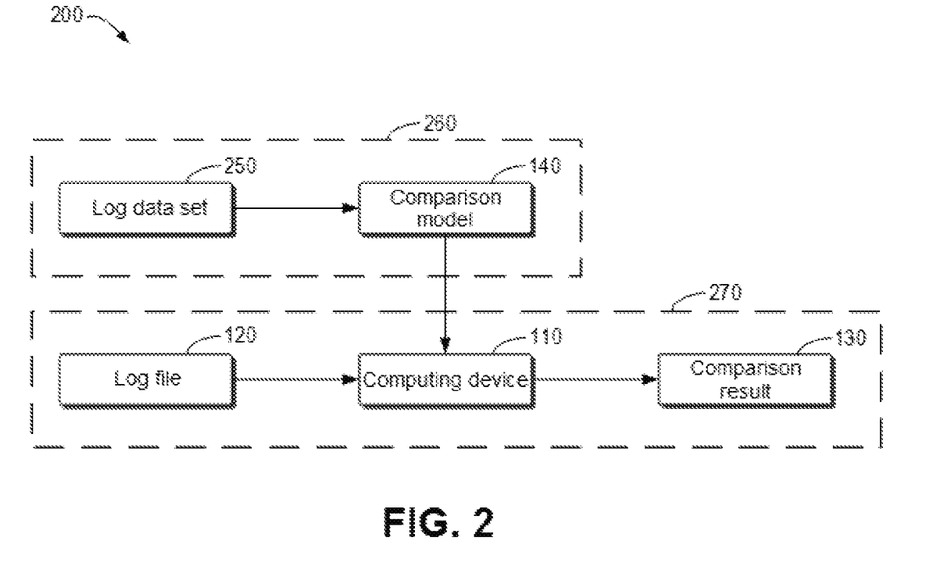
FIG. 2 shows a schematic diagram of a detailed example environment in which a plurality of embodiments of the present disclosure can be implemented.

FIG. 2 shows a schematic diagram of detailed example environment 200 in which a plurality of embodiments of the present disclosure can be implemented. Similar to FIG. 1, example environment 200 may include computing device 110, log file 120, and comparison result 130. The difference is that example environment 200 generally may include model training system 260 and model application system 270. As an example, model training system 260 and/or model application system 270 may be implemented by computing device 110 as shown in FIG. 1 or FIG. 2. It should be understood that the structure and function of example environment 200 are described for illustrative purposes only, and do not imply any limitation to the scope of the subject matter described herein. The subject matter described herein can be implemented in different structures and/or functions.

As mentioned above, the solution for comparing log identifiers according to the present disclosure may be divided into two stages: a model training stage and a model application stage. In the model training stage, model training system 260 may use log data set 250 to train comparison model 140 for comparing log identifiers. In the model application stage, model application system 270 may receive trained comparison model 140 and log file 120 to generate comparison result 130. In some embodiments, log data set 250 may be mass annotated log records or corresponding log identifiers.

It should be understood that comparison model 140 may also be constructed as a deep learning network for comparing log identifiers. Such a deep learning network may also be called a deep learning model. In some embodiments, the deep learning network used for comparing log identifiers may include a plurality of networks, where each network may be a multilayer neural network, which may be composed of a large number of neurons. Through a training process, corresponding parameters of the neurons in each network may be determined.

The technical solution described above is only used as an example, and does not limit the present invention. In order to explain the principle of the above solution more clearly, the process of analyzing a log file will be described in more detail below with reference to FIG. 3.

Figure 3:
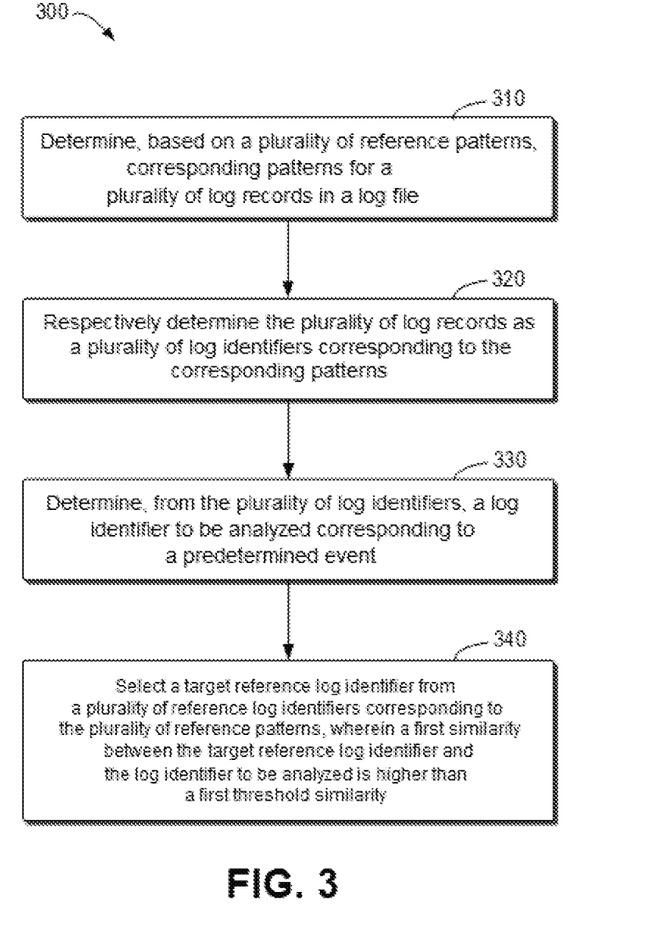
FIG. 3 shows a flowchart of a process for analyzing a log file according to an embodiment of the present disclosure.

FIG. 3 shows a flowchart of process or method 300 for analyzing a log file according to an embodiment of the present disclosure. In some embodiments, method 300 may be implemented in a device shown in FIG. 6. As an example, method 300 may be implemented in computing device 110 shown in FIG. 1 and FIG. 2. Process or method 300 for analyzing a log file according to the embodiment of the present disclosure shown in FIG. 3 will now be described with reference to FIG. 1. For ease of understanding, the specific data mentioned in the following description are all illustrative and are not intended to limit the scope of protection of the present disclosure.

At 310, computing device 110 may determine corresponding patterns for a plurality of log records 150 in log file 120 based on a plurality of reference patterns stored in a database. In some embodiments, computing device 110 may acquire the plurality of reference patterns from a reference pattern database, and when a first log record (for example, log record 150-2) in the plurality of log records 150 matches a first reference pattern in the plurality of reference patterns described above, the first reference pattern is determined as a pattern of the first log record.

Figure 4:
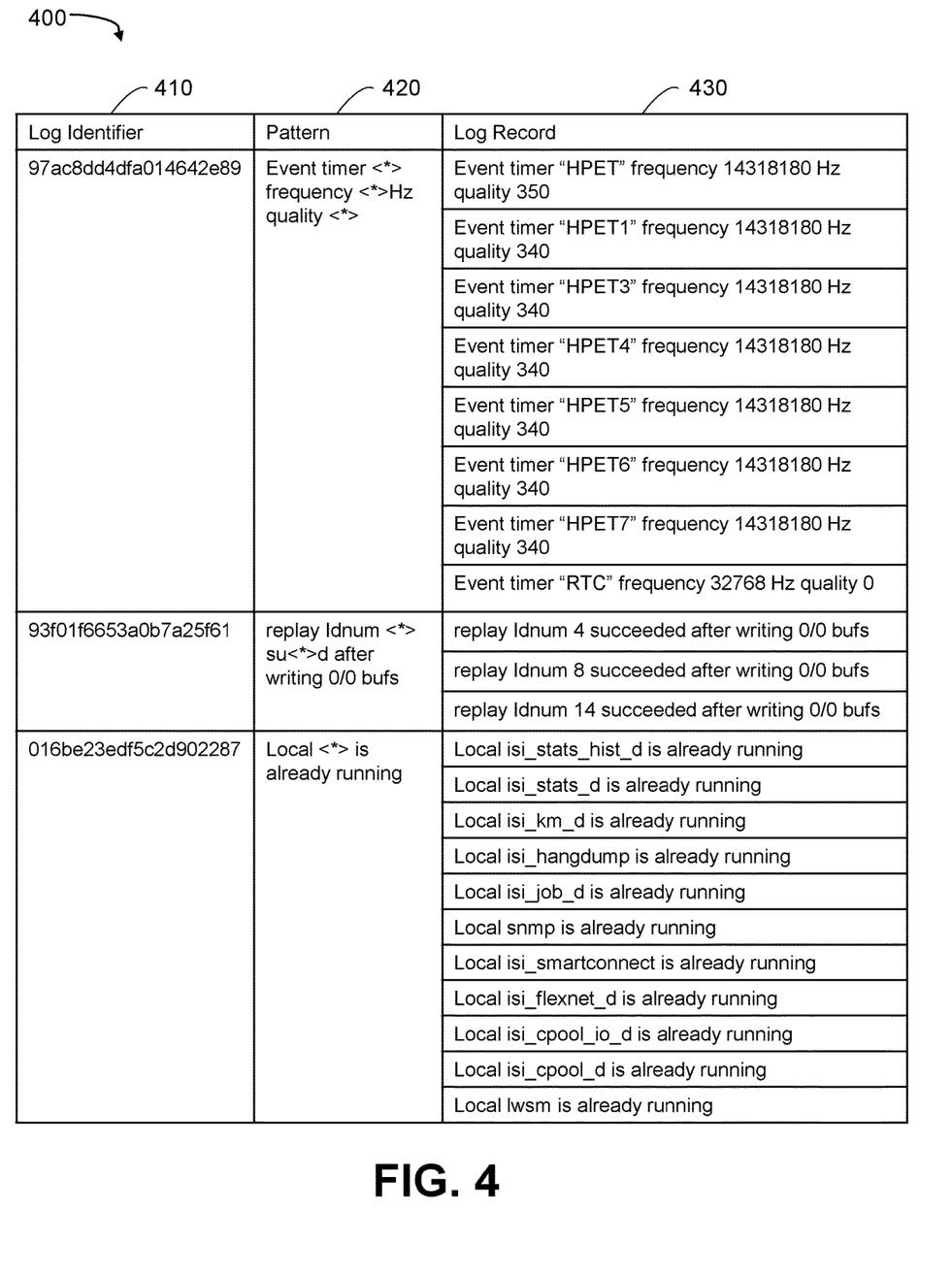
FIG. 4 is an example chart of a correspondence between log records, patterns, and log identifiers according to an embodiment of the present disclosure.

FIG. 4 is example chart 400 of a correspondence between log records, patterns, and log identifiers according to an embodiment of the present disclosure. As shown in FIG. 4, "Log Record" column 430 shows a plurality of log records, some of which have specific rules. Wildcards may be used to determine the pattern of log records with the same specific rule, that is, segments containing wildcards in "pattern" column 420. Therefore, several log records can match one pattern. "Log Identifier" column 410 shows a plurality of character strings composed of numbers and letters, which may be used to uniquely indicate identity information (ID) of corresponding patterns.

At 320, computing device 110 may respectively determine the plurality of log records as a plurality of log identifiers corresponding to the corresponding patterns. As shown in FIG. 4, one pattern may correspond to one log identifier. It should be understood that although FIG. 4 shows a correspondence between log records, patterns, and log identifiers, only the correspondence between patterns and log identifiers may be stored in the database so as to reduce the use of storage resources.

In some embodiments, computing device 110 may acquire a mapping relationship between a plurality of reference patterns and a plurality of reference log identifiers as shown in FIG. 4 from a reference pattern database. Based on the mapping relationship, computing device 110 may acquire a reference log identifier corresponding to the first reference pattern in the foregoing embodiment. Furthermore, computing device 110 may convert the first log record (for example, log record 150-2) in the foregoing embodiment into the reference log identifier corresponding to the first reference pattern. As an example, upon receipt of log file 120, the computing device may scan the received log file, compare each log record therein with logs or their patterns stored in the database, and finally return a log identifier corresponding to the matching pattern. If a certain log record does not match any pattern, a new pattern may be generated, and the mapping relationship between reference patterns and reference log identifiers may be updated. In addition, in order to simplify the processing flow, some reference log identifiers in the database may be pre-marked as "key log identifiers" corresponding to predetermined events, so that a log identifier to be analyzed corresponding a predetermined event may be determined more quickly in subsequent operations.

At 330, computing device 110 may determine a log identifier to be analyzed corresponding to a predetermined event from the plurality of log identifiers described above. In some embodiments, computing device 110 may determine the log identifier to be analyzed when the predetermined event occurs based on time stamp information of the log file. As an example, when a predetermined event such as a user report (a report initiated by a user discovering a possible system problem) occurs, the log record generated at that moment may be found, and then the log identifier thereof may be determined as the log identifier to be analyzed. It should be understood that the user report is only an example of the predetermined event. The predetermined event may also include a thread crash event, a system indicator abnormity event, etc. In this way, log records that are not easily recognized accurately by, for example, an NLP model may be converted into log identifiers or log identifier sequences that can be accurately recognized.

In addition, in other embodiments, as described in the above embodiment, since some reference log identifiers in the database are pre-marked as "key log identifiers," a log identifier in the plurality of log identifiers may be determined as a log identifier to be analyzed as long as the log identifier matches a "key log identifier."

At 340, computing device 110 may select a target reference log identifier from the plurality of reference log identifiers corresponding to the plurality of reference patterns, where a first similarity between the target reference log identifier and the log identifier to be analyzed is higher than a first threshold similarity. Preferably, computing device 110 may determine a reference log identifier that is most similar to or the same as the log identifier to be analyzed as the target reference log identifier.

After the target reference log identifier is determined, computing device 110 may process, based on a predetermined diagnosis strategy of the target reference log identifier for the predetermined event, the log record corresponding to the log identifier to be analyzed. Computing device 110 can automatically process the corresponding log record with reference to the predetermined diagnosis strategy, thereby improving system performance and reducing labor costs.

It should be understood that, in most cases, the log identifier to be analyzed is only a log identifier and is only used to represent one log record. In this case, the first similarity can be determined only by comparing a pair of log identifiers. However, there may also be a case where the log identifier to be analyzed contains a plurality of log identifiers and is used to represent a plurality of log records. For example, a fault report generated by using the Backtrace function contains a plurality of log records, that is, containing a plurality of converted log identifiers. At this moment, the Levenshtein distance algorithm, for example, may be used to compare the plurality of log identifiers included in the log identifier to be analyzed and corresponding reference log identifiers in the database. Of course, a machine learning or deep learning model may also be used for comparison.

It should also be understood that the above description with reference to FIG. 3 is only an operation for one or a group of log identifiers to be analyzed corresponding to the predetermined event. The one or group of log identifiers to be analyzed may be regarded as the "kernel" of part of the log file. However, in addition to the "kernel," its context log identifiers, that is, other log identifiers that are away from the "kernel" for a predetermined period of time or predetermined entries, also have reference values. Hereinafter, a specific embodiment of an integrated context log identifier will be described in detail with reference to FIG. 5.

Figure 5:
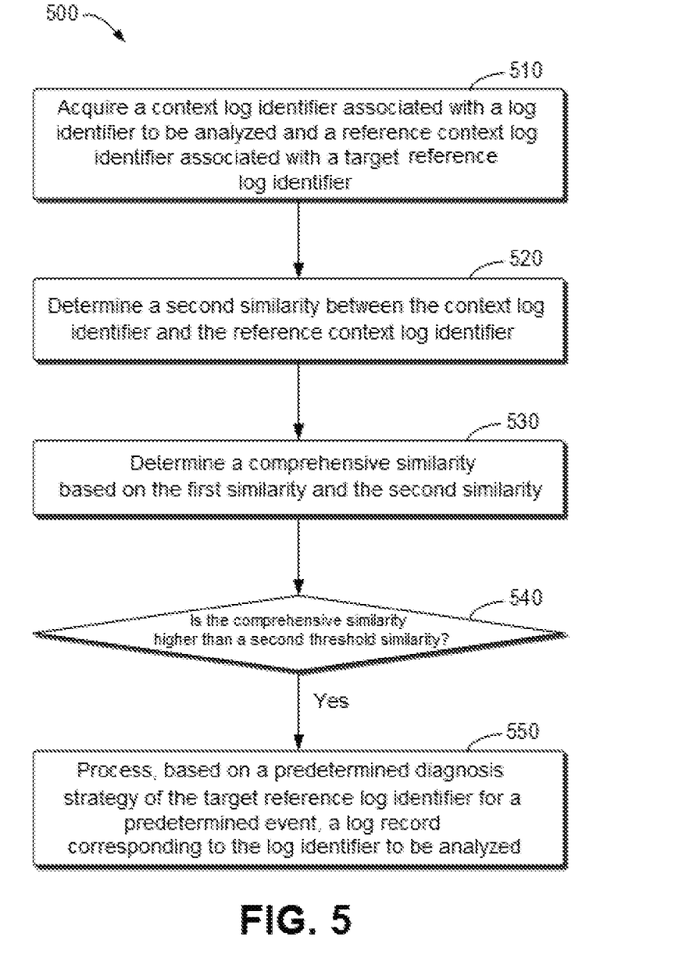
FIG. 5 shows a flowchart of a process for analyzing a log file according to an embodiment of the present disclosure.

FIG. 5 shows a flowchart of process or method 500 for analyzing a log file according to an embodiment of the present disclosure. In some embodiments, method 500 may be implemented in the device shown in FIG. 6. As an example, method 500 may be implemented in computing device 110 shown in FIG. 1 and FIG. 2. Process or method 500 for analyzing a log file according to the embodiment of the present disclosure shown in FIG. 5 will now be described with reference to FIG. 1. For ease of understanding, the specific data mentioned in the following description are all illustrative and are not intended to limit the scope of protection of the present disclosure.

At 510, computing device 110 may acquire a context log identifier associated with the aforementioned log identifier to be analyzed and a reference context log identifier associated with the aforementioned target reference log identifier. In some embodiments, a time interval between the context log identifier and the log identifier to be analyzed is less than a threshold time interval. For example, the context log identifier includes all log identifiers half an hour before the log identifier to be analyzed and all log identifiers half an hour after the log identifier to be analyzed. Correspondingly, a time interval between the reference context log identifier and the target reference log identifier is less than the aforementioned threshold time interval. For example, the reference context log identifier includes all reference log identifiers half an hour before the target reference log identifier and all reference log identifiers half an hour after the target reference log identifier in the database.

It should also be understood that there may be idle time intervals in the log identifiers near the log identifier to be analyzed, that is, there may be default entries in the determined context log identifier. In this case, the reference value of the context log identifier may be reduced. Therefore, the context log identifier that is a predetermined number of entries away from the log identifier to be analyzed can also be determined according to the number of entries of the log identifiers.

At 520, computing device 110 may determine a second similarity between the context log identifier and the reference context log identifier. As previously mentioned, the context log identifier is the log identifiers near the log identifier to be analyzed. Since context log records have been converted into a context log identifier sequence by looking up the mapping relationship between log identifiers and patterns in the database, this sequence is similar to a word sequence in an article. Therefore, the NLP technology may be used to process the context log identifier sequence. The NLP technology may include "bag of words," term frequency—inverse document frequency (TF-IDF), BERT, etc. As an example, context log identifiers may be extracted first, and then, for example, the TF-IDF algorithm may be used to calculate a weighted frequency of each log identifier to obtain TF-IDF vectors. Finally, the similarity between the context log identifier and the reference context log identifier may be calculated by comparing the TF-IDF vectors. It should be understood that a machine learning or deep learning model may also be used for comparison.

At 530, computing device 110 may determine a comprehensive similarity based on the first similarity and the second similarity. For example, the comprehensive similarity may be determined by performing weighted average on the first similarity and the second similarity. In addition, in order to make the comparison result more focused on the first similarity (i.e., focused on the log identifier to be analyzed), it may be restricted to determine the comprehensive similarity as the weighted average of the first similarity and the second similarity only when the first similarity is greater than a predetermined threshold. In other cases, only the first similarity is considered.

Furthermore, at 540, computing device 110 may determine whether the comprehensive similarity is higher than a second threshold similarity. If the comprehensive similarity is higher than the second threshold similarity, the method proceeds to 550. At 550, the computing device 110 may process, based on the predetermined diagnosis strategy of the target reference log identifier for a predetermined event, a log record corresponding to the log identifier to be analyzed. In some embodiments, the comprehensive similarity represents the similarity between a log segment related to the predetermined event in the log file to be analyzed and a reference log segment in a plurality of reference log records. A log identifier set of the log segment includes the log identifier to be analyzed and the context log identifiers, and a log identifier set of the reference log segment corresponds to target reference log identifier information and reference context log identifier information.

It should be noted that the above operation provides a technical solution for comparing a log identifier to be analyzed and its context log identifiers with a log identifier set in a database. This comparison can be used for further log analysis. The log analysis may be used to determine similar system problems and determine an associated knowledge base, thereby resolving similar service requests.

By implementing the above process, the comparison process with reference log records in a database may be simplified by converting log records in a log file into log identifiers corresponding to patterns. In addition, by comparing one or a group of log identifiers to be analyzed that are most related to a predetermined event with log identifiers in the database, the above process may find the most relevant target reference log identifier, and thus a processing method for the log identifier to be analyzed may be determined based on a solution corresponding to the target reference log identifier. Moreover, for more definite and more accurate comparison results, contextual comparison results may also be synthesized. Since the context log records have been converted into the context log identifiers, the context log identifiers may be processed using the NLP technology, thereby avoiding misidentification of log records caused by the conventional use of the NLP technology.

Figure 6:
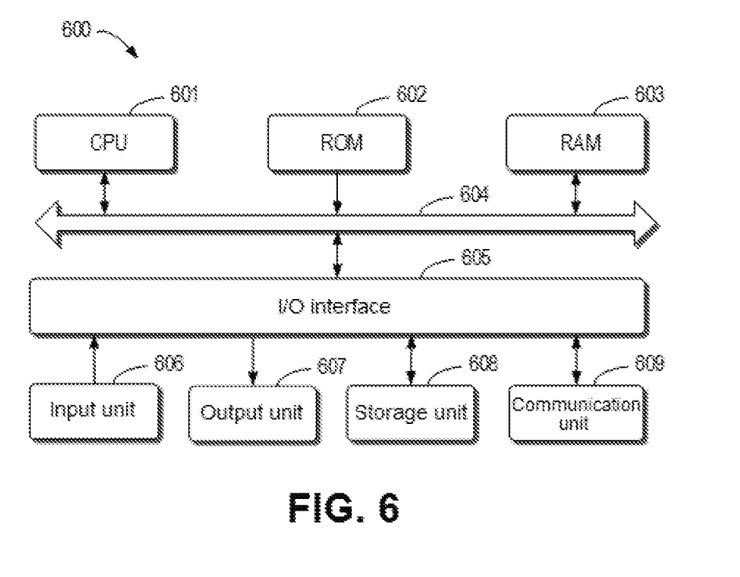
FIG. 6 shows a block diagram of a computing device that can implement a plurality of embodiments of the present disclosure.

FIG. 6 shows a schematic block diagram of example device 600 that can be configured to implement an embodiment of the content of the present disclosure. As shown in the figure, device 600 includes central processing unit (CPU) 601 that can perform various appropriate actions and processing according to computer program instructions stored in read-only memory (ROM) 602 or computer program instructions loaded from storage unit 608 into random access memory (RAM) 603. In RAM 603, various programs and data required for the operation of device 600 can also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, such as methods 300 and/or 500, may be performed by CPU 601. For example, in some embodiments, methods 300 and/or 500 may be embodied as a computer software program that is tangibly included in a machine-readable medium, such as storage unit 608. In some embodiments, part or all of the computer program may be loaded and/or installed onto device 600 via ROM 602 and/or communication unit 609. When the computer program is loaded into RAM 603 and executed by CPU 601, one or more actions of methods 300 and/or 500 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device such as a punch card or a protruding structure in a groove with instructions stored thereon, and any suitable combination of the foregoing. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to otherwise enable persons of ordinary skill in the art to understand the embodiments disclosed herein.

What is claimed is:

1. A method for analyzing a log file, comprising:
determining, based at least in part on a plurality of reference patterns, corresponding patterns for a plurality of log records in the log file;
respectively determining the plurality of log records as a plurality of log identifiers associated with the corresponding patterns;
determining, from the plurality of log identifiers, a first log identifier associated with a first one of the plurality of log records to be analyzed corresponding to a predetermined event;
selecting a target reference log identifier from a plurality of reference log identifiers corresponding to the plurality of reference patterns, wherein a first similarity between the target reference log identifier and the first log identifier to be analyzed is higher than a first threshold similarity;
acquiring a context associated with the first log identifier, the context comprising one or more additional log identifiers associated with one or more additional ones of the plurality of log records collected at least one of before and after the first log record;
performing a diagnosis of one or more system issues associated with the first log record based at least in part on (i) analyzing a first log identifier sequence comprising the first log identifier and the one or more additional log identifiers and (ii) analyzing a predetermined diagnosis strategy of the target reference log identifier;
wherein analyzing the first log identifier sequence comprises:
generating the first log identifier sequence comprising the first log identifier and the one or more additional log identifiers;
generating a second log identifier sequence comprising the target reference log identifier and one or more additional reference context log identifiers associated with the target reference log identifier; and
utilizing one or more machine learning models to determine a second similarity between the first log identifier sequence and the second log identifier sequence; and
automatically remediating the one or more system issues associated with the first log record utilizing the predetermined diagnosis strategy responsive to determining that the second similarity between the first log identifier sequence and the second log identifier sequence is higher than a second threshold similarity.

2. The method according to claim 1, further comprising:
processing, based at least in part on the predetermined diagnosis strategy of the target reference log identifier for the predetermined event, the first log record corresponding to the first log identifier to be analyzed.

3. The method according to claim 1, wherein selecting the target reference log identifier comprises:
acquiring the one or more additional reference context log identifiers associated with the target reference log identifier;
determining a comprehensive similarity based at least in part on the first similarity and the second similarity; and
according to a determination that the comprehensive similarity is higher than a third threshold similarity, processing, based at least in part on the predetermined diagnosis strategy of the target reference log identifier for the predetermined event, the first log record corresponding to the first log identifier to be analyzed.

4. The method according to claim 3, wherein a time interval between the one or more additional log identifiers and the first log identifier to be analyzed is less than a threshold time interval, and a time interval between the one or more additional reference context log identifiers and the target reference log identifier is less than the threshold time interval.

5. The method according to claim 1, wherein determining the corresponding patterns for the plurality of log records comprises:
   acquiring the plurality of reference patterns from a reference pattern database; and
   in response to matching of the first log record in the plurality of log records with a first reference pattern in the plurality of reference patterns, determining the first reference pattern as a pattern of the first log record.

6. The method according to claim 5, wherein respectively determining the plurality of log records as the plurality of log identifiers comprises:
   acquiring, from the reference pattern database, a mapping relationship between the plurality of reference patterns and the plurality of reference log identifiers;
   acquiring, based at least in part on the mapping relationship, a reference log identifier corresponding to the first reference pattern; and
   determining the reference log identifier corresponding to the first reference pattern as the first log identifier of the first log record.

7. The method according to claim 1, wherein determining the first log identifier to be analyzed corresponding to the predetermined event comprises:
   determining, based at least in part on time stamp information of the log file, the first log identifier to be analyzed when the predetermined event occurs.

8. The method according to claim 1, wherein the predetermined event comprises at least one of the following:
   a thread crash event;
   a user report event; and
   a system indicator abnormity event.

9. An electronic device, comprising:
   at least one processing unit; and
   at least one memory coupled to the at least one processing unit and storing machine-executable instructions, wherein the instructions, when executed by the at least one processing unit, cause the device to perform actions comprising:
   determining, based at least in part on a plurality of reference patterns, corresponding patterns for a plurality of log records in the log file;
   respectively determining the plurality of log records as a plurality of log identifiers associated with the corresponding patterns;
   determining, from the plurality of log identifiers, a first log identifier associated with a first one of the plurality of log records to be analyzed corresponding to a predetermined event;
   selecting a target reference log identifier from a plurality of reference log identifiers corresponding to the plurality of reference patterns, wherein a first similarity between the target reference log identifier and the first log identifier to be analyzed is higher than a first threshold similarity;
   acquiring a context associated with the first log identifier, the context comprising one or more additional log identifiers associated with one or more additional ones of the plurality of log records collected at least one of before and after the first log record;
   performing a diagnosis of one or more system issues associated with the first log record based at least in part on (i) analyzing a first log identifier sequence comprising the first log identifier and the one or more additional log identifiers and (ii) analyzing a predetermined diagnosis strategy of the target reference log identifier;
   wherein analyzing the first log identifier sequence comprises:
      generating the first log identifier sequence comprising the first log identifier and the one or more additional log identifiers;
      generating a second log identifier sequence comprising the target reference log identifier and one or more additional reference context log identifiers associated with the target reference log identifier; and
      utilizing one or more machine learning models to determine a second similarity between the first log identifier sequence and the second log identifier sequence; and
   automatically remediating the one or more system issues associated with the first log record utilizing the predetermined diagnosis strategy responsive to determining that the second similarity between the first log identifier sequence and the second log identifier sequence is higher than a second threshold similarity.

10. The device according to claim 9, wherein the actions further comprise:
   processing, based at least in part on the predetermined diagnosis strategy of the target reference log identifier for the predetermined event, the first log record corresponding to the first log identifier to be analyzed.

11. The device according to claim 9, wherein selecting the target reference log identifier comprises:
   acquiring the one or more additional reference context log identifiers associated with the target reference log identifier;
   determining a comprehensive similarity based at least in part on the first similarity and the second similarity; and
   according to a determination that the comprehensive similarity is higher than a third threshold similarity, processing, based at least in part on the predetermined diagnosis strategy of the target reference log identifier for the predetermined event, the first log record corresponding to the first log identifier to be analyzed.

12. The device according to claim 11, wherein a time interval between the one or more additional log identifiers and the first log identifier to be analyzed is less than a threshold time interval, and a time interval between the one or more additional reference context log identifiers and the target reference log identifier is less than the threshold time interval.

13. The device according to claim 9, wherein determining the corresponding patterns for the plurality of log records comprises:
   acquiring the plurality of reference patterns from a reference pattern database; and
   in response to matching of the first log record in the plurality of log records with a first reference pattern in the plurality of reference patterns, determining the first reference pattern as a pattern of the first log record.

14. The device according to claim 13, wherein respectively determining the plurality of log records as the plurality of log identifiers comprises:
   acquiring, from the reference pattern database, a mapping relationship between the plurality of reference patterns and the plurality of reference log identifiers;

acquiring, based at least in part on the mapping relationship, a reference log identifier corresponding to the first reference pattern; and determining the reference log identifier corresponding to the first reference pattern as the first log identifier of the first log record.

15. The device according to claim 9, wherein determining the first log identifier to be analyzed corresponding to the predetermined event comprises:

determining, based at least in part on time stamp information of the log file, the first log identifier to be analyzed when the predetermined event occurs.

16. The device according to claim 9, wherein the predetermined event comprises at least one of the following:

a thread crash event;

a user report event; and a system indicator abnormity event.

17. A computer program product tangibly stored on a non-transitory computer-readable medium and comprising machine-executable instructions, wherein the machine-executable instructions, when executed, cause a machine to perform a method for analyzing a log file, the method comprising:

determining, based at least in part on a plurality of reference patterns, corresponding patterns for a plurality of log records in the log file;

respectively determining the plurality of log records as a plurality of log identifiers associated with the corresponding patterns;

determining, from the plurality of log identifiers, a first log identifier associated with a first one of the plurality of log records to be analyzed corresponding to a predetermined event;

selecting a target reference log identifier from a plurality of reference log identifiers corresponding to the plurality of reference patterns, wherein a first similarity between the target reference log identifier and the first log identifier to be analyzed is higher than a first threshold similarity;

acquiring a context associated with the first log identifier, the context comprising one or more additional log identifiers associated with one or more additional ones of the plurality of log records collected at least one of before and after the first log record;

performing a diagnosis of one or more system issues associated with the first log record based at least in part on (i) analyzing a first log identifier sequence comprising the first log identifier and the one or more additional log identifiers and (ii) analyzing a predetermined diagnosis strategy of the target reference log identifier;

wherein analyzing the first log identifier sequence comprises:

generating the first log identifier sequence comprising the first log identifier and the one or more additional log identifiers;

generating a second log identifier sequence comprising the target reference log identifier and one or more additional reference context log identifiers associated with the target reference log identifier; and utilizing one or more machine learning models to determine a second similarity between the first log identifier sequence and the second log identifier sequence; and automatically remediating the one or more system issues associated with the first log record utilizing the predetermined diagnosis strategy responsive to determining that the second similarity between the first log identifier sequence and the second log identifier sequence is higher than a second threshold similarity.

18. The computer program product according to claim 17, wherein the method further comprises:

processing, based at least in part on the predetermined diagnosis strategy of the target reference log identifier for the predetermined event, the first log record corresponding to the first log identifier to be analyzed.

19. The computer program product according to claim 17, wherein selecting the target reference log identifier comprises:

acquiring the one or more additional reference context log identifiers associated with the target reference log identifier;

determining a comprehensive similarity based at least in part on the first similarity and the second similarity; and according to a determination that the comprehensive similarity is higher than a third threshold similarity, processing, based at least in part on the predetermined diagnosis strategy of the target reference log identifier for the predetermined event, the first log record corresponding to the first log identifier to be analyzed.

20. The computer program product according to claim 17, wherein determining the corresponding patterns for the plurality of log records comprises:

acquiring the plurality of reference patterns from a reference pattern database; and in response to matching of the first log record in the plurality of log records with a first reference pattern in the plurality of reference patterns, determining the first reference pattern a s a pattern of the first log record.

* * * * *